July 25, 1961 P. JUNGHANNS 2,993,714
SNAP-FASTENER
Filed June 3, 1960
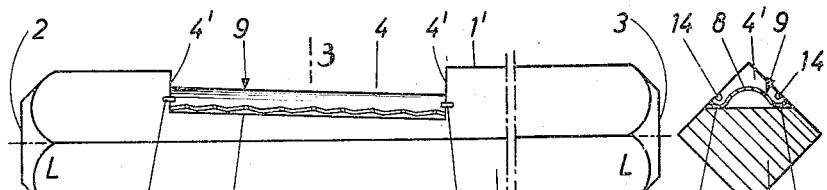
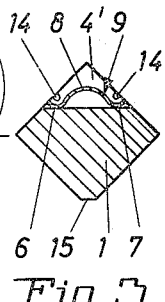
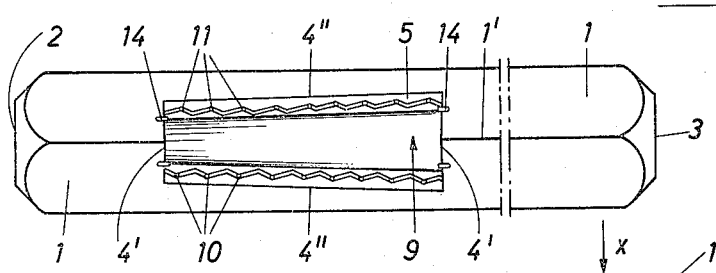
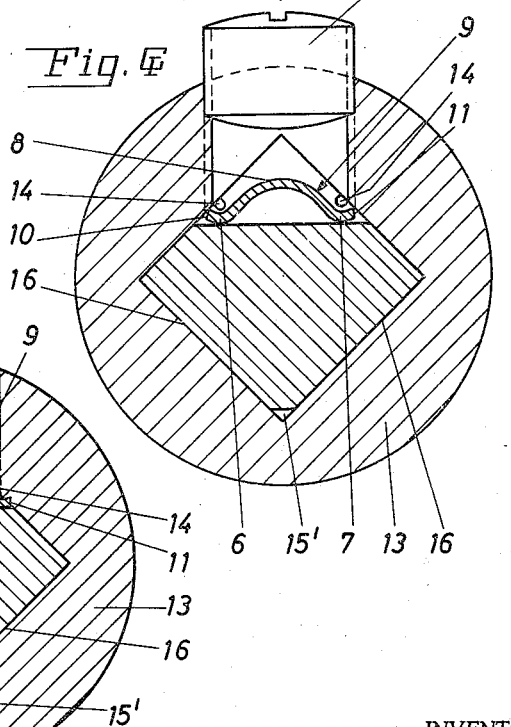
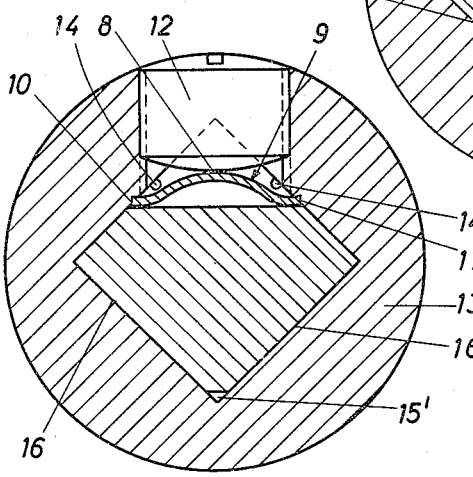
INVENTOR.
Paul Junghanns
BY

United States Patent Office 2,993,714
Patented July 25, 1961

2,993,714
SNAP-FASTENER

Paul Junghanns, Heiligenhaus, Rhineland, Germany, assignor to Firma Wilh. Engstfeld, Heiligenhaus, Rhineland, Germany, a corporation of Germany
Filed June 3, 1960, Ser. No. 33,714
Claims priority, application Germany Sept. 3, 1959
2 Claims. (Cl. 287—53)

The present invention relates to a snap-fastener for releasable holding of the fastener grip on a fastener pin.

In the known snap-fasteners, the pin is rigidly inserted into the fastener grip, for instance by casting or pressing, while the other fastener grip is connected with the pin only after insertion of the lock.

In order to bring about such connection, cross-pins have already been used, which are driven into corresponding cross-bores of the fastener shaft and the pin. In order to avoid these cross-pins, which are of a disadvantage in some manner, it is also known already to equip the fastener-pin at its free end with barbed hooks, which enter, after insertion of the pin into the fastener shaft, into the material of the walls of the latter, and are there anchored. By providing this connection, exact fittings are required, which causes rather high manufacturing costs. Additionally, it is also not possible to release this holding of the fastener on the pin.

Furthermore, a releasable fastener connection with a square fastener pin is known, in which a spring blade inserted into a recess of the pin moves behind the shoulder of a niche provided in the recess and retains the fastener in longitudinal direction. By this connection, it is, however, not possible to achieve a floating free connection of the fastener on the pin, and also not a rigid clamp seat. In order to bring about such clamp seat, fastener connections are also known, wherein the pin has two recesses angularly disposed relative towards each other, in which recesses a spring blade enters which is angularly bent in its cross plane and a set screw engages the bent apex which is disposed within the fastener shaft and which may be radially tightened. The tightening of the set screw leads to a wedge clamping effect, since the arms of the spring blade press between the bottom faces of the recesses and the inner walls of the opening of the fastener shaft.

In the more advantageous embodiment of such fastener connection, the arms of the spring blade bent in the cross plane are additionally waved, so that the clamping effect brings about an engagement on a plurality of points. Yet, the last-mentioned fastener connection type has still disadvantages concerning its technical manufacture. In particular, the production of the recesses with their bottom faces disposed angularly towards each other is difficult. Furthermore, the production of correspondingly bent and, respectively, waved spring blades brings about difficulties, particularly because these springs have a great inner stability, which makes the complicated formation rather difficult.

It is, therefore, one object of the present invention to provide a snap-fastener which includes a spring blade disposed in a recess of the fastener pin and crosswise bent, as well as operated by a set screw, wherein the recess of the fastener pin may be produced in one single step and wherein said spring blade of simplest formation mounted in said recess is forced in addition to a clamping effect to perform a clutch-like entrance into the fastener shaft.

It is another object of the present invention to provide a snap-fastener wherein the above-stated object is brought about by engaging the spring blade with its arm ends on the bottom of a prismatic recess worked from one longitudinal edge of the fastener.

Due to such formation, a very simple manufacturing of the recess in the pin is provided. It may be produced afterwards in one working step by chip-working from the square pin. The recess may, however, be formed also therein. The arm ends of the spring blade bent in its cross plane engaging the set screw working on the bent apex of the spring blade, and reach the edge of the bottom face and enter then into the inner wall of the fastener shaft. This arrangement makes it possible to secure pins having different cross-section measurements with a single size of a spring. The weakening of the pin is also appreciably less due to the working-in of the recess, than it is experienced in known fastener connections. Due to the pressure effect of the spring prior to its clutch-like entrance into the fastener shaft material, a step-wise retaining is also brought about, since at first a play-free pressing in of the pin into the recess of the fastener shaft is achieved, and then the absolute security against longitudinal movement by entrance of the spring arms into the material of the fastener shaft is obtained.

An embodiment particularly favorable for such arrangement is realized, in accordance with the present invention, in such manner that the ends of the spring arms terminate into jagged projections spaced apart from the bottom face of the recess.

It is yet another object of the present invention to provide a snap-fastener wherein a rather stable connection is brought about over longer periods of use by an arrangement according to which the bottom face of the recess is disposed inclined to the longitudinal axis of the pin and the spring blade is of a wedge design. Due to such formation, the holding force is always increased with corresponding mounting of the solid fastener and of the loose fastener on the pin during a pulling movement.

In order to achieve a play-free pressing in of the pin into the inner recess of the fastener shaft, in accordance with the present invention the longitudinal edge opposite to the recess of the pin is broken.

By such arrangement it is achieved that upon loading the spring blade the side faces of the pin which are adjacent the broken longitudinal edge of the pin engage play-free the inner wall of the recess of the fastener shaft, so that a very good fitting seat is assured, even if low tolerances have been found during the manufacture.

With these and other objects in view which will become apparent in the following detailed description, the present invention will be clearly understood in connection with the accompanying drawings, in which:

FIGURE 1 is a side elevation of the pin with a spring blade inserted therein;

FIG. 2 is a top plan view of the pin;

FIG. 3 is a section along the lines 3—3 of FIG. 1;

FIG. 4 is a section through the fastener connection at an enlarged scale prior to the tightening of the radial set screw of the fastener shaft; and FIG. 5 is a section through the fastener connection at an enlarged scale after tightening of the radial set screw of the fastener shaft.

Referring now to the drawings, and in particular to FIGS. 1 to 3, the rod-like, square-shaped fastener pin 1 has two ends 2 and 3. The end 3 carries the rigid fastener (not shown) in which the pin 1 is inserted in conventional manner by casting or pressing. The end 2 is adapted to receive the so-called loose fastener, which is mounted upon passing through the pin 1 by means of the pinion of the mounted lock.

The pin 1 has a prismatic recess 4 which is worked in from the longitudinal edge 1' of the fastener. The arm ends 6 and 7 of a spring blade 9, bent over the apex 8, are supported on the bottom face 5 of the recess 4. The arm ends 6 and 7 terminate into jagged projections 10 and 11 which are spaced apart from the bottom face 5 of the recess 4, and thus extend freely above the bottom surface 5. A set screw 12 is engageable with the apex 8 of the spring blade 9, which set screw may be tightened radially into the fastener shaft 13 in the direction of the arrow $x$.

Notches 14 are worked out, from the edges of the end faces 4' of the recess 4, which prevent a removal of the spring blade 9 from the recess 4.

The bottom face 5 of the recess is inclined towards the longitudinal axis L—L of the pin. Corresponding with the one-sided narrowing of the bottom face 5 caused by the inclination, the spring blade 9 is of wedge shape. By this arrangement it is achieved that the jagged projections 10 and 11 assume always equal distance from the edges 4" of the bottom face 5 of the recess 4 throughout its entire length.

The longitudinal edge 15 of the pin which is opposite the recess 4 is broken off, so that a free space 15' (FIGS. 4 and 5) remains upon insertion of the pin 1 into the fastener shaft 13.

Upon mounting of the fastener shaft 13, which is equipped with the set screw 12, upon the free end 2 of the pin 1 (FIG. 4) the set screw 12 is tightened in the direction of the arrow $x$. The set screw 12 eventually engages the apex 8 of the spring blade 9. Due to the broken longitudinal edge 15 of the pin 1, at first a completely satisfactory fitting seat is brought about, since the side faces 16 of the fastener pin engage tightly the corresponding inner walls of the recess in the fastener shaft 13. Upon further tightening of the set screw 12, the ends of the arms 6 and 7 of the spring blade 9 and, thereby, the projections 10 and 11 of the spring blade 9 move in the direction of the edges 4" of the recess 4. They eventually enter into the material of the fastener shaft 13 (FIG. 5). The simple shape of the spring blade 9 provides such great inner stability that the forces necessary for the penetration into the material of the fastener shaft may be assumed in each case by the inner stability of the spring.

While I have disclosed one embodiment of the present invention, it is to be understood that this embodiment is given by example only and not in a limiting sense, the scope of the present invention being determined by the objects and the claims.

I claim:
1. A releasable connection between a door knob and a fastener pin having a rectangular cross-section, and received in an opening of said knob, for operation of a door lock, said fastener pin having a prismatic recess, the latter forming a bottom face, a spring blade having a wave-shaped cross-section and received in said recess, said spring blade having lateral arms, the marginal portions of the latter engaging said bottom face of said recess, said marginal portions forming teeth at their edge, said teeth being adapted to engage the adjacent inner faces of said door knob, the latter having a radially disposed, threaded bore terminating in said recess of said fastener pin, and a set screw received in said threaded bore and pressing against the apex of said spring blade in order to cause said teeth of said spring blade to bite into said adjacent inner faces of said door knob.

2. The fastener connection, as set forth in claim 1, wherein said bottom face of said recess is inclined relative to the longitudinal axis of said fastener pin and said spring blade has a complementary wedge shape.

References Cited in the file of this patent
UNITED STATES PATENTS

| | | |
|---|---|---|
| 251,988 | Young | Jan. 3, 1882 |
| 951,836 | Noack | Mar. 15, 1910 |
| 2,950,134 | Strange | Aug. 23, 1960 |